(12) United States Patent
Gaza et al.

(10) Patent No.: US 10,157,205 B2
(45) Date of Patent: Dec. 18, 2018

(54) PARALLEL PREPARATION OF A QUERY EXECUTION PLAN IN A MASSIVELY PARALLEL PROCESSING ENVIRONMENT BASED ON GLOBAL AND LOW-LEVEL STATISTICS

(71) Applicant: International Business Machines Corporation, Armonk, NY (US)

(72) Inventors: Lukasz Gaza, Jankowice (PL); Artur M. Gruszecki, Cracow (PL); Tomasz Kazalski, Cracow (PL); Konrad K. Skibski, Zielonki (PL); Tomasz K. Stradomski, Bedzin (PL)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 14/948,483

(22) Filed: Nov. 23, 2015

(65) Prior Publication Data
US 2017/0147640 A1 May 25, 2017

(51) Int. Cl.
*G06F 17/30* (2006.01)

(52) U.S. Cl.
CPC .............. *G06F 17/30463* (2013.01)

(58) Field of Classification Search
CPC combination set(s) only.
See application file for complete search history.

(56) References Cited

U.S. PATENT DOCUMENTS

| | | | |
|---|---|---|---|
| 6,529,901 B1 * | 3/2003 | Chaudhuri | G06F 17/30463 |
| 7,234,112 B1 | 6/2007 | Brown et al. | |
| 8,126,870 B2 | 2/2012 | Chowdhuri et al. | |
| 8,335,767 B2 | 12/2012 | Das et al. | |
| 8,356,027 B2 | 1/2013 | Jaecksch et al. | |
| 8,600,977 B2 | 12/2013 | Dageville et al. | |
| 2003/0088579 A1 * | 5/2003 | Brown | G06F 17/30595 |
| 2009/0132536 A1 * | 5/2009 | Brown | G06F 9/5083 |
| 2009/0132611 A1 * | 5/2009 | Brown | G06F 17/30575 |
| 2013/0085986 A1 * | 4/2013 | Burger | G06F 9/505 |
| | | | 707/609 |
| 2013/0262435 A1 | 10/2013 | Bossman et al. | |
| 2014/0156632 A1 * | 6/2014 | Yu | G06F 17/30469 |
| | | | 707/713 |

(Continued)

OTHER PUBLICATIONS

Schikuta et al., "A Knowledge Base for the Optimization of Parallel Query Execution Plans", Institute of Applied Computer Science and Information Systems Department of Data Engineering, University of Vienna, 1087-4089/97 © 1997 IEEE, pp. 331-337.

(Continued)

*Primary Examiner* — Shyue Jiunn Hwa
(74) *Attorney, Agent, or Firm* — Gilbert Harmon, Jr.

(57) ABSTRACT

In an approach to preparing a query execution plan, a host node receives a query implicating one or more data tables. The host node broadcasts one or more implicated data tables to one or more processing nodes. The host node receives a set of node-specific query execution plans and execution cost estimates associated with each of the node-specific query execution plans, which have been prepared in parallel based on global statistics and node-specific low level statistics. The host node selects an optimal query execution plan based on minimized execution cost.

17 Claims, 3 Drawing Sheets

(56) References Cited

U.S. PATENT DOCUMENTS

2015/0058316 A1* 2/2015 Bruno ............... G06F 17/30442
  707/718

OTHER PUBLICATIONS

Weidner, et al., "Fast OLAP Query Execution in Main Memory on Large Data in a Cluster", 2013 IEEE International on Big Data, 978-1-4799-1293-3/13 ©°2013 IEEE, pp. 518-524.

White, "Parallel Execution Plans—Branches and Threads", SQLPerformance.com, Oct. 7, 2013, <http://sqlperformance.com/2013/10/sql-plan/parallel-plans-branches-threads>, 9 pages.

* cited by examiner

PARALLEL PREPARATION OF A QUERY EXECUTION PLAN IN A MASSIVELY PARALLEL PROCESSING ENVIRONMENT BASED ON GLOBAL AND LOW-LEVEL STATISTICS

TECHNICAL FIELD OF THE INVENTION

The present disclosure relates generally to the field of information retrieval, and more particularly to the preparation of a query execution plan.

BACKGROUND OF THE INVENTION

A query execution plan is an ordered set of steps used to access data in a database system. The query execution plan defines in detail, for example, which steps will be performed in order to process a query (a request for information retrieval) and in what order the steps will be performed. Optimal execution time is a crucial aspect of query performance, but the complexity of its calculation can make the preparation of a query execution plan difficult, especially when online analytical processing (OLAP) environments are considered.

SUMMARY

According to one embodiment of the present invention, a computer-implemented method for preparation of a query execution plan is provided. The method comprises: receiving, by one or more computer processors, a query implicating one or more data tables; broadcasting, by one or more computer processors, to one or more processing nodes, one or more implicated data tables; receiving, by one or more computer processors, a set of node-specific query execution plans and an execution cost estimate associated with each node-specific query execution plan, wherein the set of node-specific query execution plans and associated execution cost estimates is prepared in parallel based on global statistics and node-specific low level statistics; and selecting, by one or more computer processors, an optimal query execution plan based on minimized execution cost.

According to another embodiment of the present invention, a computer program product is provided. The computer program product comprises one or more computer readable storage media and program instructions stored on the one or more computer readable storage media, the program instructions comprising: program instructions to receive a query implicating one or more data tables; program instructions to broadcast, to one or more processing nodes, one or more implicated data tables; program instructions to receive a set of node-specific query execution plans and an execution cost estimate associated with each node-specific query execution plan, wherein the set of node-specific query execution plans and associated execution cost estimates is prepared in parallel based on global statistics and node-specific low level statistics; and program instructions to select an optimal query execution plan based on minimized execution cost.

According to another embodiment of the present invention, a computer system is provided. The computer system comprises one or more processors; one or more computer readable storage media; and program instructions stored on the one or more computer readable storage media for execution by at least one of the one or more processors, the program instructions comprising: program instructions to receive a query implicating one or more data tables; program instructions to broadcast, to one or more processing nodes, one or more implicated data tables; program instructions to receive a set of node-specific query execution plans and an execution cost estimate associated with each node-specific query execution plan, wherein the set of node-specific query execution plans and associated execution cost estimates is prepared in parallel based on global statistics and node-specific low level statistics; and program instructions to select an optimal query execution plan based on minimized execution cost.

DETAILED DESCRIPTION

In modern database systems and data warehouse systems, typically a component on a host node is responsible for creating a query execution plan (also referred to herein as a "plan") to send to a number of processing nodes for execution. For example, the component can, based on data statistics and predefined rules concerning the execution costs of certain operations, generate several random plans, with several random JOINs operations orders, and pick the best one. The optimal plan may not be produced by this approach because the optimal order may not be considered. The embodiments described herein avoid this outcome by preparing a query execution plan in parallel on various processing nodes of a massively parallel processing (MPP) environment based on a mix of low level statistics from individual processing nodes and general statistics available to the host node.

Figure 1:
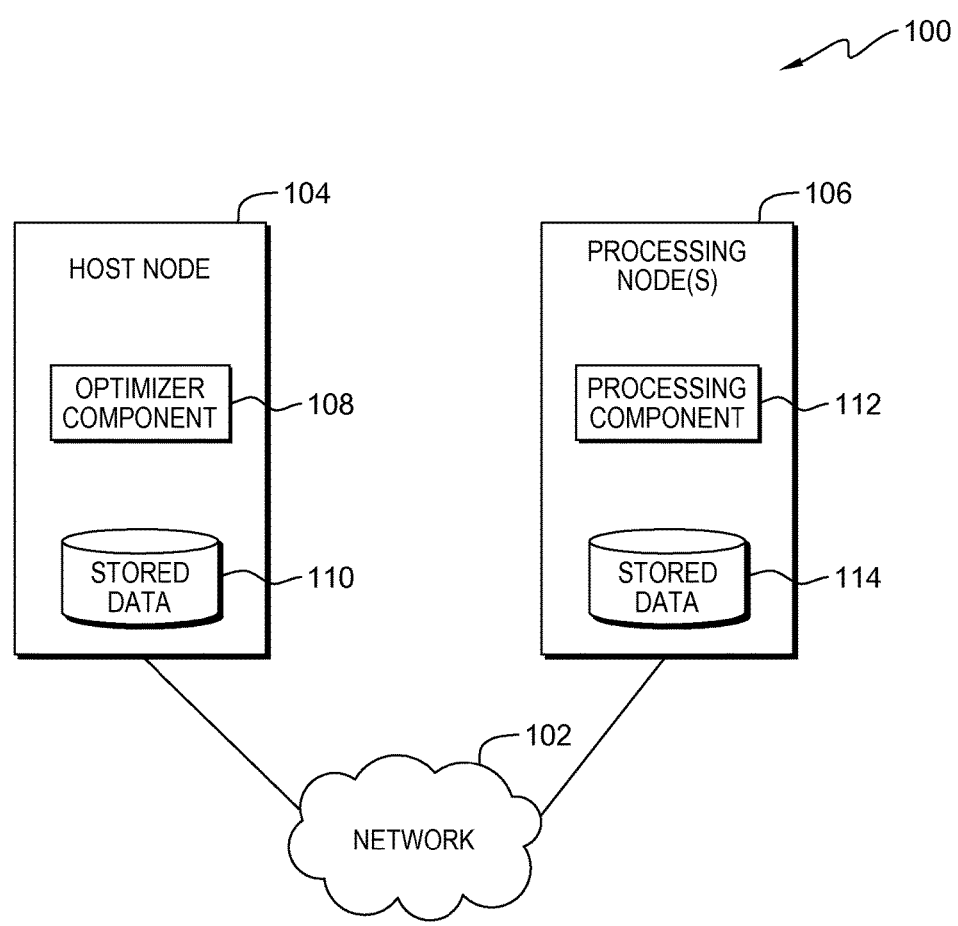
FIG. 1 is a functional block diagram of an exemplary computing environment, in accordance with embodiments of the present invention.

FIG. 1A shows a block diagram representing an MPP computing environment, generally designated MPP computing environment 100, in accordance with an embodiment of the present invention. MPP computing environment 100 includes host node 104 and multiple instances of processing node(s) 106 interconnected over network 102. Network 102 can be, for example, a telecommunications network, a local area network (LAN), a wide area network (WAN), such as the Internet, or a combination of these, and can include wired, wireless, or fiber optic connections. In general, network 102 can be any combination of connections and protocols that will support communications between host node 104 and processing node(s) 106.

Host node 104 is a database server that stores information concerning other segments of MPP computing environment 100, e.g., processing node(s) 106. Host node 104 includes optimizer component 108 and stored data 110. Host node 104 can include additional components, as depicted and described in further detail with reference to FIG. 3.

Optimizer component 108 is responsible for selection of a final query execution plan. In that capacity, optimizer component 108 performs aspects of a method for preparation of a query execution plan, as described herein with reference to FIG. 2. Optimizer component 108 receives a query, analyzes the query based on global statistics, and determines which tables stored on various instances of processing node(s) 106 will be broadcast within multiple instances of processing node(s) 106. Global statistics can include, for example but without limitation, statistics on the level of an entire data table (where different parts of the table are stored on various processing nodes), such as number of nodes and minimum and maximum values across all data. A table can be, for example but without limitation, a small dimensions table (e.g., a table of city names) or a very large fact table (e.g., a table of every transaction from a web store). Broadcasting is, for example but without limitation, sending every small table to every instance of processing node(s) 106 and distributing the fact tables (e.g., using a hash/distribution function) such that every instance of processing node(s) 106 receives part of each fact table. Further, optimizer component 108 receives the results of calculations performed by processing node(s) 106 and chooses an optimal query execution plan based on the results.

Stored data 110 comprises the afore-described global statistics.

Processing node(s) 106 represents the set of processing nodes, i.e., processing units, implicated by a query, i.e., the processing units that store data that is relevant to the query. Processing node(s) 106 can represent a large number of individual processing units, numbering for example in the thousands. Furthermore, it is not contemplated that every instance of processing node(s) 106 is identical in every respect. Processing node(s) 106 includes processing component 112 and stored data 114. Processing node(s) 106 can include additional components, as depicted and described in further detail with reference to FIG. 3.

Processing node(s) 106 participates in the creation of the query execution plan. Instances of processing node(s) 106 receive the afore-described data tables or parts of data tables broadcast by host node 104. Processing component 112 of processing node(s) 106 prepares a query execution plan determined to be optimal for that instance, based on the global statistics received from host node 104 and low level statistics associated with the data table(s) stored on that particular instance. Instances of processing node(s) 106 receive query execution plans generated by other instances, estimate a cost (e.g., a cost in terms of time) of the received plans, broadcast their own plan-cost pairs to other instances and receive the plan-cost pairs prepared by the other instances, and determine a candidate optimal query execution plan, based on which host node 104 can determine an optimal execution plan.

Stored data 114 comprises parts of the data stored in MPP computing environment 100 as a whole. For example but without limitation, stored data 114 comprises the afore-described dimensions tables and fact tables stored on a particular instance of processing node(s) 106.

Figure 2:
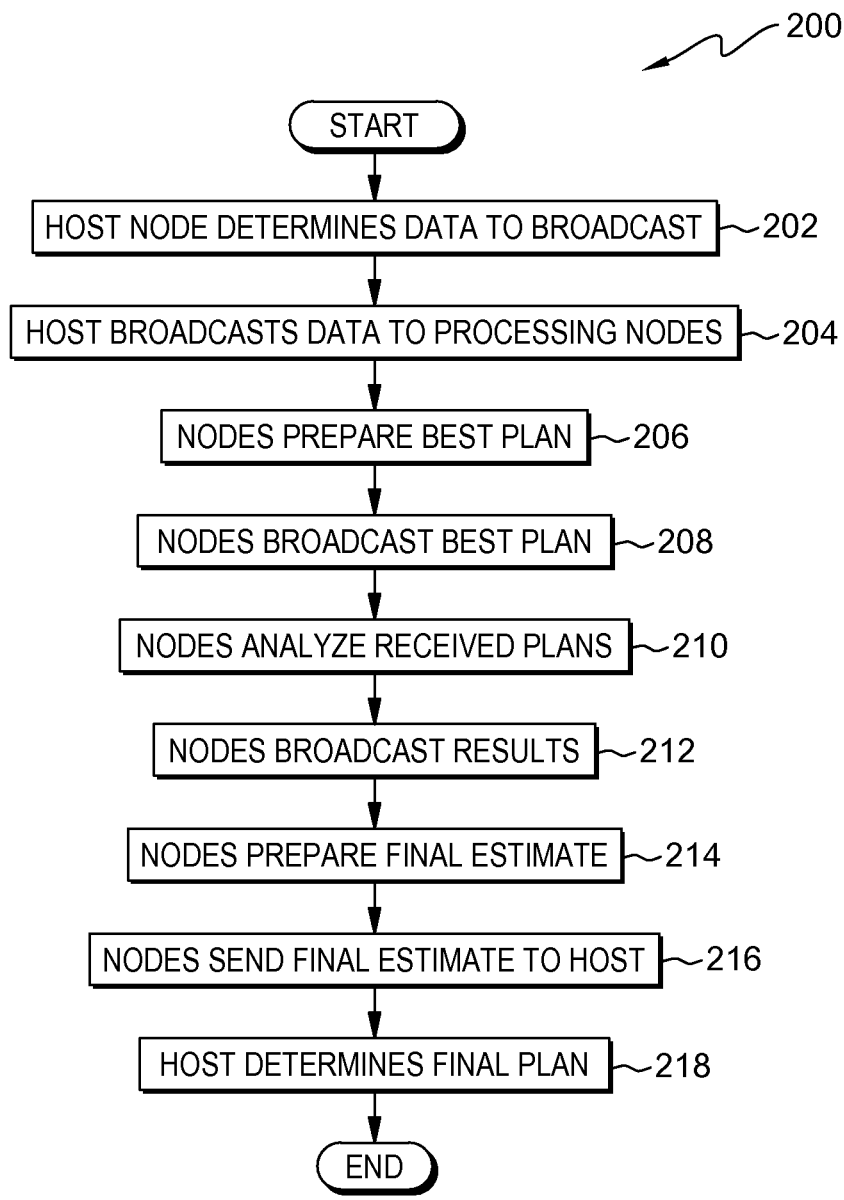
FIG. 2 is a flowchart depicting steps of a method for preparation of a query execution plan, in accordance with an embodiment of the present invention.

FIG. 2 is a flowchart 200 depicting operational steps of a method for preparation of a query execution plan, in accordance with an embodiment of the present invention.

In step 202, optimizer component 108, i.e., host node 104, analyzes a received query based on global statistics and determines which data table(s) will be broadcast within processing node(s) 106 (e.g., which data table(s) are not too large to broadcast). For example, optimizer component 108 determines that all dimensions tables will be broadcast and all fact tables will be distributed. Exemplary determinations that a table is a dimensions table or a fact table can be based on, without limitation, comparison of the number of rows in the table to a maximum number of rows (where tables exceeding the maximum number of rows are treated as fact tables); previous designation of dimensions tables and fact tables; and comparison of tables implicated by the query (where, e.g., if the ratio of the respective row counts of two implicated tables is 1:100, the smaller table is treated as a dimensions table).

In step 204, optimizer component 108 sends the determined table(s) to multiple instances of processing node(s) 106 along with the pre-processed query.

In step 206, processing node(s) 106 prepares a query execution plan based on the global statistics broadcast by host node 104 and low level statistics stored on that particular instance. The query execution plan prepared in step 206 is determined to be optimal for the specific instance of processing node(s) 106, not for the system as a whole.

In step 208, processing node(s) 106 broadcasts its own optimal query execution plan, prepared in step 206, to the other instances of processing node(s) 106.

In step 210, processing node(s) 106 analyzes the query execution plans received from the other instances. For example, processing node(s) 106 uses global statistics and low level statistics, with the low level statistics being specific to the particular instance of processing node(s) 106 performing the calculation, to determine an estimated cost associated with individual query execution plans. It is possible that every received query execution plan will be different, or alternatively that multiple instances of processing node(s) 106 will have produced the same query execution plan (i.e., there will be some redundancy in the set of plans received by processing node(s) 106). Processing node(s) 106 compares the received plans in order to determine a non-redundant set of plans.

In step 212, processing node(s) 106 broadcasts the results of the analysis performed in step 210 to the other instances. For example, processing node(s) 106 broadcasts the results as a set of plan-cost pairs to each other instance.

In step 214, processing node(s) 106 prepares an adjusted estimate based on its own plan and the results received from other instances. In preparing a candidate optimal estimate, processing node(s) 106 accounts for, for example but without limitation, parallel working steps and summation of amounts of data for each step.

In step 216, processing node(s) 106 sends the candidate optimal estimate to host node 104.

In step 218, host node 104 determines a final query execution plan based on the estimates received from processing node(s) 106. For example, host node 104 determines which of the candidate optimal estimates provided in step 216 is optimal for the system as a whole.

Figure 3:
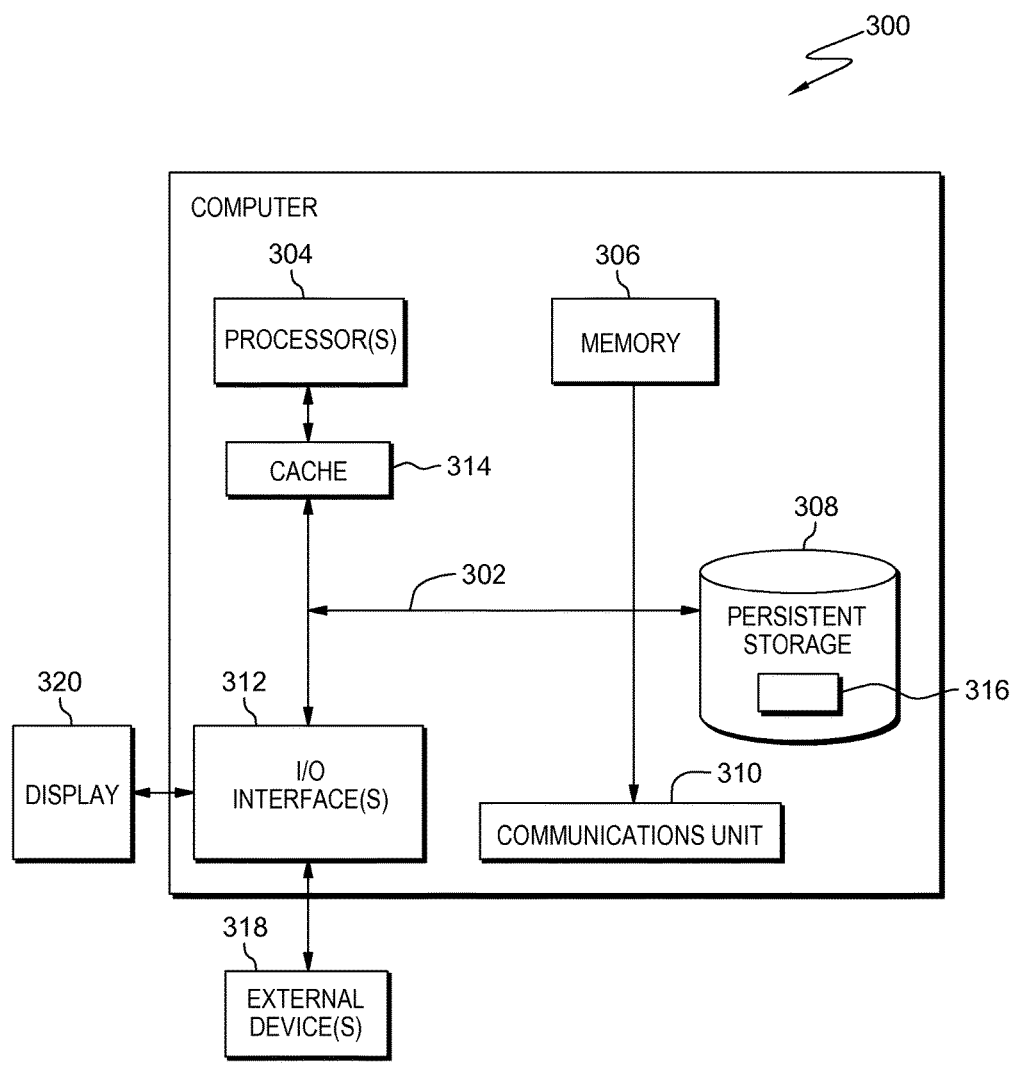
FIG. 3 is a block diagram of components of a host device or a processing device, respectively, in the computing environment of FIG. 1, in accordance with embodiments of the present invention.

FIG. 3 depicts a block diagram of components of host node 104 or processing node(s) 106, referred to collectively in the interest of simplicity as computing device 300, in MPP computing environment 100, in accordance with illustrative embodiments of the present invention. It should be appreciated that FIG. 3 provides only an illustration of one implementation and does not imply any limitations with regard to the environments in which different embodiments may be implemented. Many modifications to the depicted environment may be made.

Computing device 300 includes communications fabric 302, which provides communications between computer processor(s) 304, memory 306, persistent storage 308, communications unit 310, and input/output (I/O) interface(s) 312, and cache 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) and cache memory 314. In general, memory 306 can include any suitable volatile or non-volatile computer readable storage media. Cache 314 is a fast memory that enhances the performance of computer processor(s) 304 by holding recently accessed data, and data near accessed data, from memory 306.

In the interest of simplicity, optimizer component 108, stored data 110, processing component 112, and stored data 114 are here referred to collectively as component(s) 316. Component(s) 316 is stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. Communications unit 310 can include one or more network interface cards. Communications unit 310 can provide communications through the use of either or both physical and wireless communications links. Component(s) 316 can be downloaded to persistent storage 308 through communications unit 310.

I/O interface(s) 312 allows for input and output of data with other devices that may be connected to computing device 300. For example, I/O interface 312 can provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., component(s) 316, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a touchscreen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for preparation and execution of an optimal query execution plan in a massively parallel processing environment wherein individual processors have varying characteristics, the method comprising:
   receiving, by one or more computer processors, a query involving one or more data tables, wherein the one or more data tables are stored on a plurality of processing nodes in the massively parallel processing environment;
   determining, by one or more computer processors, whether any of the one or more data tables are too large to be broadcast;
   responsive to determining any of the one or more data tables are too large to be broadcast, distributing, by one or more computer processors, the data tables determined to be too large to be broadcast to the plurality of processing nodes;
   broadcasting, by the one or more computer processors, to the plurality of processing nodes, one or more of the data tables, determined not to be too large for broadcasting, and a pre-processed query, wherein the plurality of processing nodes are of differing processing capability;
   receiving, by the one or more computer processors, candidate plans comprising a set of processing-node-specific query execution plans and an execution cost estimate associated with each processing-node-specific query execution plan, wherein the set of processing-node-specific query execution plans and associated execution cost estimates is prepared in parallel on the plurality of processing nodes based on global statistics related to more than one processing node, low level statistics related to individual processing nodes and adjustments, by the individual processing nodes, based on the differences between processing-node-specific query execution plans and wherein each of the processing-node-specific query execution plans is optimized by an associated one of the plurality of processing nodes for the one of the plurality of processing nodes;
   selecting, by the one or more computer processors, an optimal query execution plan based on minimized execution cost, wherein the optimal query execution plan is one of the candidate plans; and
   executing, by the one or more computer processors, the optimal query execution plan.

2. The computer-implemented method of claim 1, wherein execution cost comprises time required for execution.

3. The computer-implemented method of claim 1, wherein low level statistics comprise statistics on the level of an individual processing node and data stored on the individual processing node.

4. The computer-implemented method of claim 1, wherein the candidate plans comprise whole-system-optimal query execution plans selected by the plurality of processing nodes.

5. The computer-implemented method of claim 4, wherein the whole-system-optimal query execution plans are selected by the plurality of processing nodes based on comparison, among the plurality of processing nodes, of a plurality of processing-node-optimal query execution plans.

6. The computer-implemented method of claim 5, wherein the candidate plans are based on adjustments to the set of processing-node-optimal query execution plans, based on sharing of information concerning the set of processing-node-optimal query execution plans among the plurality of processing nodes.

7. A computer program product for preparation and execution of an optimal query execution plan in a massively parallel processing environment wherein individual processors have varying characteristics, the computer program product comprising:
one or more computer readable storage media and program instructions stored on the one or more computer readable storage media, the program instructions comprising:
program instructions to receive a query involving one or more data tables, wherein the one or more data tables are stored on a plurality of processing nodes in the massively parallel processing environment;
program instructions to determine whether any of the one or more data tables are too large to be broadcast;
responsive to determining any of the one or more data tables are too large to be broadcast, program instructions to distribute the data tables determined to be too large to be broadcast to the plurality of processing nodes;
program instructions to broadcast to the plurality of processing nodes, one or more of the data tables, determined not to be too large for broadcasting, and a pre-processed query, wherein the plurality of processing nodes are of differing processing capability;
program instructions to receiving receive candidate plans comprising a set of processing-node-specific query execution plans and an execution cost estimate associated with each processing-node-specific query execution plan, wherein the set of processing-node-specific query execution plans and associated execution cost estimates is prepared in parallel on the plurality of processing nodes based on global statistics related to more than one processing node, low level statistics related to individual processing nodes and adjustments, by the individual processing nodes, based on the differences between processing-node-specific query execution plans and wherein each of the processing-node-specific query execution plans is optimized by an associated one of the plurality of processing nodes for the one of the plurality of processing nodes;
program instructions to select an optimal query execution plan based on minimized execution cost, wherein the optimal query execution plan is one of the candidate plans; and
program instructions to execute the optimal query execution plan.

8. The computer program product of claim 7, wherein execution cost comprises time required for execution.

9. The computer program product of claim 7, wherein low level statistics comprise statistics on the level of an individual processing node and data stored on the individual processing node.

10. The computer program product of claim 7, wherein the candidate plans comprise whole-system-optimal query execution plans selected by the plurality of processing nodes.

11. The computer program product of claim 7, wherein the whole-system-optimal query execution plans are selected by the plurality of processing nodes based on comparison, among the plurality of processing nodes, of a plurality of processing-node-optimal query execution plans.

12. The computer program product of claim 11, wherein the candidate plans are based on adjustments to the set of processing-node-optimal query execution plans, based on sharing of information concerning the set of processing-node-optimal query execution plans among the plurality of processing nodes.

13. A computer system for preparation and execution of an optimal query execution plan in a massively parallel processing environment wherein individual processors have varying characteristics, the computer system comprising:
one or more processors;
one or more computer readable storage media; and
program instructions stored on the one or more computer readable storage media for execution by at least one of the one or more processors, the program instructions comprising:
program instructions to receive a query involving one or more data tables, wherein the one or more data tables are stored on a plurality of processing nodes in the massively parallel processing environment;
program instructions to determine whether any of the one or more data tables are too large to be broadcast;
responsive to determining any of the one or more data tables are too large to be broadcast, program instructions to distribute the data tables determined to be too large to be broadcast to the plurality of processing nodes;
program instructions to broadcast to the plurality of processing nodes, one or more of the data tables, determined not to be too large for broadcasting, and a pre-processed query, wherein the plurality of processing nodes are of differing processing capability;
program instructions to receiving receive candidate plans comprising a set of processing-node-specific query execution plans and an execution cost estimate associated with each processing-node-specific query execution plan, wherein the set of processing-node-specific query execution plans and associated execution cost estimates is prepared in parallel on the plurality of processing nodes based on global statistics related to more than one processing node, low level statistics related to individual processing nodes and adjustments, by the individual processing nodes, based on the differences between processing-node-specific query execution plans and wherein each of the processing-node-specific query execution plans is optimized by an associated one of the plurality of processing nodes for the one of the plurality of processing nodes;
program instructions to select an optimal query execution plan based on minimized execution cost, wherein the optimal query execution plan is one of the candidate plans; and
program instructions to execute the optimal query execution plan.

14. The computer system of claim 13, wherein low level statistics comprise statistics on the level of an individual processing node and data stored on the individual processing node.

15. The computer system of claim 13, wherein the candidate plans comprise whole-system-optimal query execution plans selected by the plurality of processing nodes.

16. The computer system of claim 13, wherein the whole-system-optimal query execution plans are selected by the plurality of processing nodes based on comparison, among the plurality of processing nodes, of a plurality of processing-node-optimal query execution plans.

17. The computer system of claim 13, wherein the candidate plans are based on adjustments to the set of processing-node-optimal query execution plans, based on sharing of information concerning the set of processing-node-optimal query execution plans among the plurality of processing nodes.

\* \* \* \* \*